June 16, 1953   J. J. DREZNES   2,641,826
METHOD OF FORMING FILTER HOUSINGS
Filed Jan. 29, 1949   3 Sheets-Sheet 1
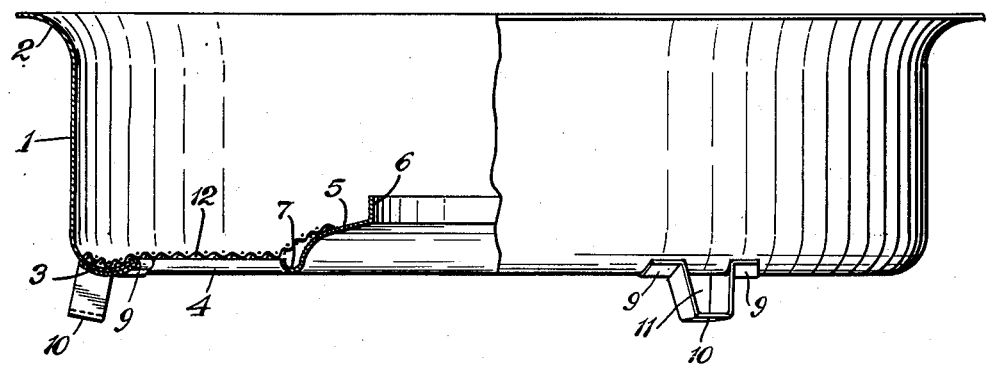
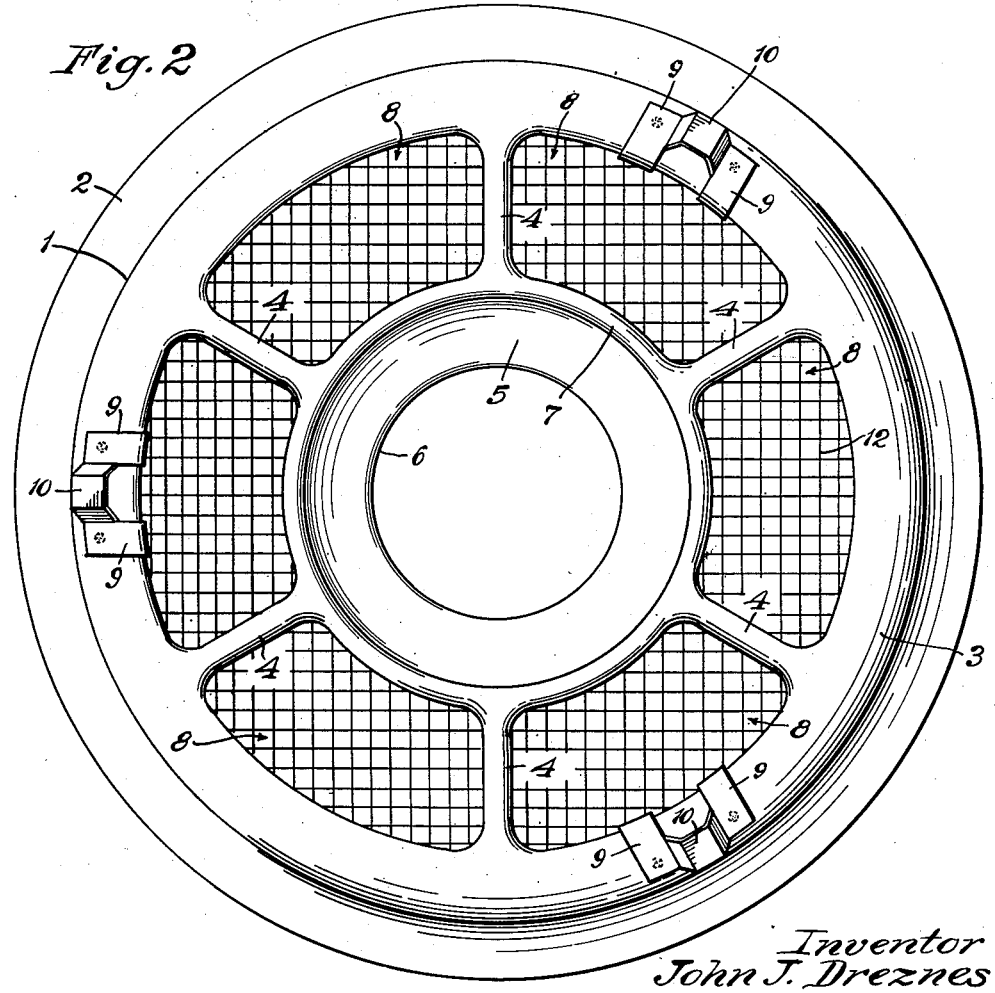
Inventor
John J. Dreznes
by Parker & Carter
Attorneys.

Inventor
John J. Dreznes
by Parker + Carter
Attorneys

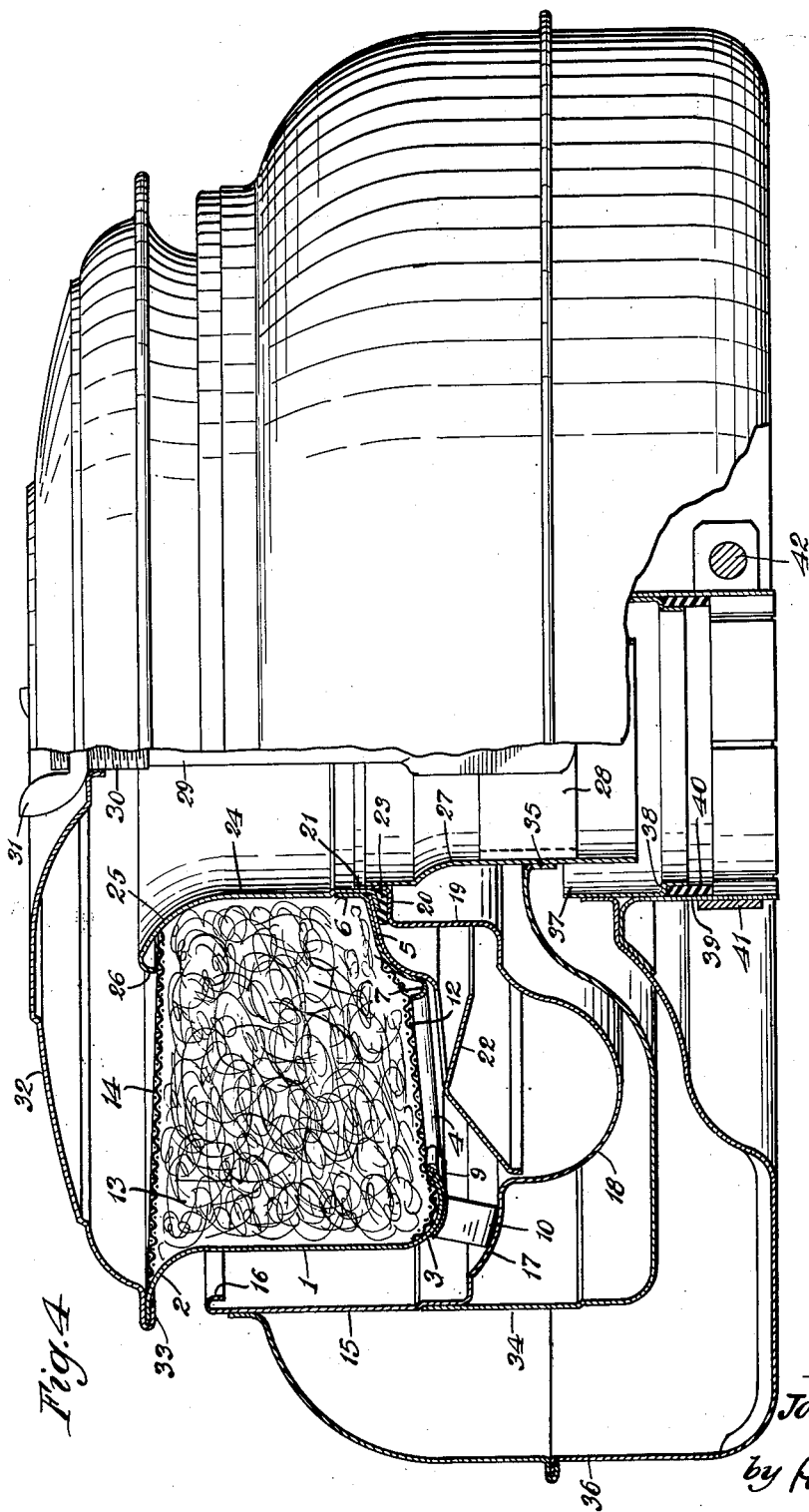

Patented June 16, 1953

2,641,826

UNITED STATES PATENT OFFICE 2,641,826

METHOD OF FORMING FILTER HOUSINGS

John J. Dreznes, Chicago, Ill., assignor to United Specialties Company, Chicago, Ill., a corporation of Delaware Application January 29, 1949, Serial No. 73,594

3 Claims. (Cl. 29—148.2)

1

This invention relates to an air cleaner or dust separator and in its present form is particularly directed to the method of making a housing which encloses the filter unit in such an air cleaner.

Another object is to provide a filter body intended to be positioned in a cleaner assembly and to provide, as a part of the body, spacing means to insure proper spacing of the filter body within the total air cleaner assembly.

Another object is to provide a method of forming such spacing means.

Another object is to provide a method of forming such spacing means integrally with the body housing and of forming such spacing means as a part of the process or method of forming the filter body housing.

Other objects will appear from time to time in the course of the specification.

This invention is illustrated more or less diagrammatically in the accompanying drawings wherein:

Figure 1 is a section through one form of the housing or container for the filter body;

Figure 2 is a bottom plan view of the housing member shown in Figure 1;

Figure 4 is a side elevation with parts in section illustrating a complete cleaner with the device of the present invention in place therein.

Like parts are indicated by like numbers throughout the specification and drawings.

Figure 3:
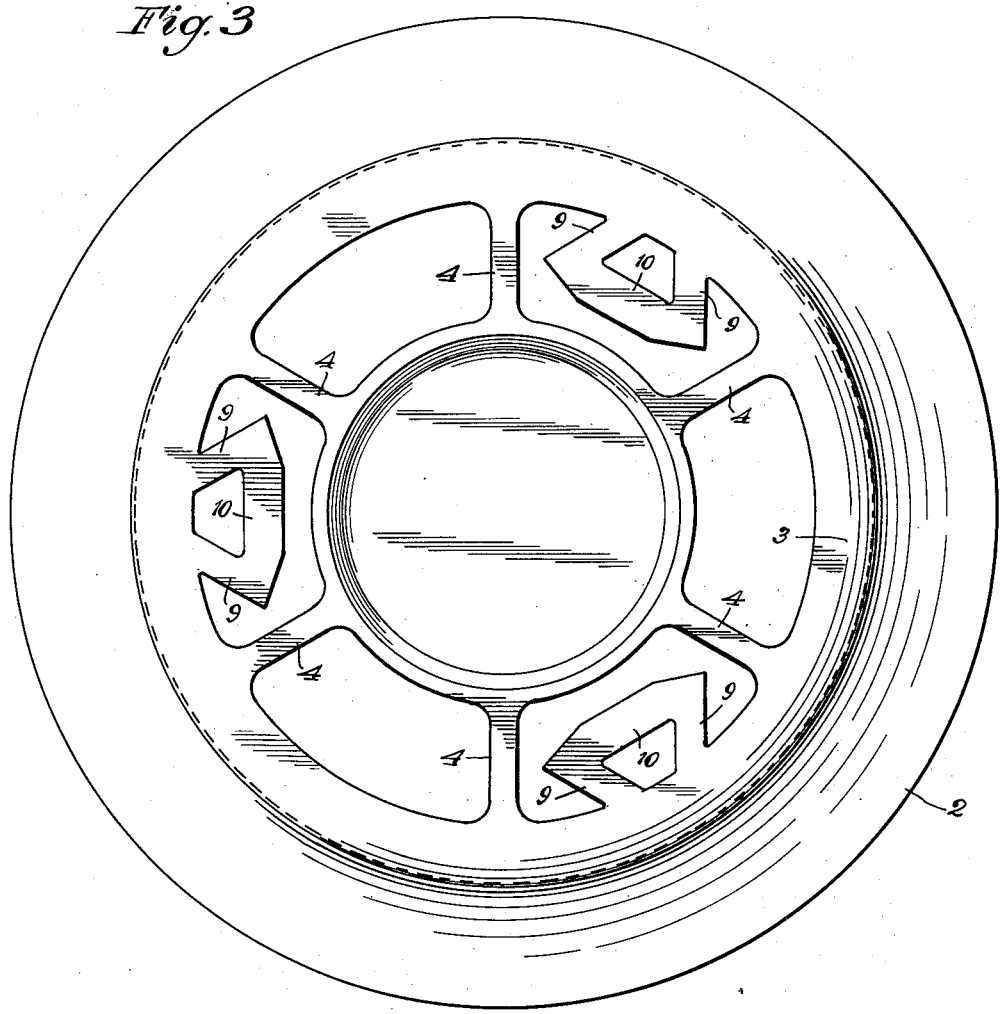
Figure 3 is a plan view showing the blank from which the housing is formed before the housing has been given its final shape.

The housing or container for the filter mass which together with the filter mass comprises the filter body is shown in its completed form in Figures 1 and 2 and assembled with the total cleaner in Figure 4. This housing comprises a member having an annular wall 1 and an outwardly bent or curved upper flange 2. The wall 1 is integral at its lower end with a curved portion 3 which is connected by arms 4 to a central ring-like portion 5 which terminates in an upwardly projecting annular portion 6. The member 5 is upturned at its outer edges to provide a trough-like portion 7 and the arms 4, as shown in Figure 1 particularly, are provided with upturned edges so that their lower surfaces are round. The arms 4 are formed by severing parts of the blank from which the housing is made. This severing operation produces openings or spaces 8 between the arms 4.

When the severing or shearing operation to form the spaces 8 is carried out, three or more members are allowed to remain to form legs which support and space the housing. Each of

2 these legs comprises a pair of side portions 9 which are integral with the blank and which are joined by an integral central portion 10. The portion 10 joins the members 9. When the leg is in the finished position, as shown in Figure 1 particularly, an opening or space 11 is formed within the leg and the leg thus presents a minimum of resistance to flow past or through it. The leg is preferably made of thin material to present a minimum of resistance to the flow of fluid. After the leg portion has been severed, as shown in Figure 3, it is shaped to bring the two parts 9, 9 into parallelism, as shown in Figure 2. Then it is bent about the exterior of the curved portion 3 of the housing. The portions 9 are bent flush against the outer surface of the curved portion 3 and the connecting portion 10 is shaped to lie transversely between the members 9 and to form an outwardly projecting open foot or leg portion. After this shaping operation has been carried out, a section of wire screen or other perforate material is laid in position, as shown particularly in Figure 1, and this screen section 12 spans the openings 8 and overlies the feet portions 9 and 10. After the screen section is in place it is welded to the housing, and at the same welding operation the portions 9 are welded to the outer surface of the housing. Thus at a single welding operation the screen is welded in place and the feet portions 9 are welded in place. The welding steps are not essential. Since the legs formed by the parts 9 and 10 are integral with the shell 2, they may merely be shaped properly without being welded or otherwise additionally secured in place, and the screen may merely be laid into place, if desired. Thus the foot construction is formed integrally with the housing. It is formed of material which would otherwise be wasted, and it is formed simultaneously with the formation of the housing. Similarly, only a single welding is required to secure the screen section in place and to secure the feet members in place.

With the filter body housing formed, as shown in Figure 1, it is then filled with a mass of filter material 13, and, if desired, a member 14 which may be formed of wire mesh or other perforate material is placed on top of the filter mass 13.

The filter body is assembled with a cleaner. The cleaner comprises, as shown in Figure 4, a housing member 15 which is provided with a downwardly and inwardly turned lip 16 at its upper edge. The housing is closed at its bottom by a cup portion which includes the relatively flat curved part 17 and the deeper and more sharply curved portion 18. A tubular portion 19 is integral with the portion 18 and is also integral with a shoulder 20 and an upwardly extending tubular portion 21. A baffle 22 is positioned on the shoulder 20 and a gasket 23 seals the members. The filter body is positioned above the baffle 22 and the center of the filter body is defined by an air passage member 24 which is outwardly flared at 25 and terminates in a downwardly bent lip portion 26. A tubular member 27 is secured to the tubular portion 21 and contains a spider 28 within which a retaining member 29 is fixed. This member is threaded at its upper end at 30 to receive a thumb nut 31. A cover plate 32 comprises the top of the cleaner and is fixed to the filter body housing portion by being downwardly bent, as at 33, about the outer edge of the flared portion 2 of the housing 1.

Fixed to the cup member 15 is a second cup 34 which is also fixed at its inner edge, as at 35, to the tubular member 27. A resonator 36 is positioned about a substantial portion of the cleaner assembly and is fixed at its inner edge to a tubular member 37 which is shaped to provide a shoulder 38. A second tubular member 39 is also fixed to the resonator and a packing member 40 is positioned against the shoulder 38 between the members 37 and 39. A clamping ring 41 is positioned about the member 39 and is provided with a tightening and attaching screw 42 by means of which the cleaner is removably and adjustably fixed in place upon a carburetor intake or at any other place where a cleaner of this type is to be used.

The filter body shown and described herewith is not limited in its use to the particular association shown. It might be used with many types of cleaners. It is intended for use with a cleaner which includes a cup portion and the feet provide accurate and positive spacing of the filter body within the cup portion. The filter body 1 and the cup portion 15 form an annular inlet passage and it is important that that passage be uniform and that the filter body be accurately and positively spaced within the cleaner. It is also important to interrupt the flow of air or fluid as little as possible. The legs present a minimum resistance and interruption to the flow of air past them. As shown particularly in Figure 1, the legs are open and only the thin section of the legs is presented to the inflowing air and thus a minimum of resistance and disturbance is caused by the legs.

While it is economical to form legs of the type shown as described above and as a part of the method of formation of the housing, obviously instead of forming these U-shaped legs integrally with the housing, they might be separately formed. Thus a U-shaped clip or leg, similar in shape and size to that shown in the drawings, might be formed separately and welded or otherwise secured to the housing 1 in the position in which the legs 9, 10 are shown.

Whatever the exact contour of the legs and whatever the exact method of forming or attaching them may be, they are so arranged that they have sufficient structural strength to form a positive stopping and spacing means to insure the proper positioning of the filter body with relation to the cleaner housing. Also, the legs are so shaped that they present a minimum of resistance to the flow of air entering the cleaner. The air flowing through the air gap between the housings 1 and 15 passes parallel to the width of the leg.

Although I have shown an operative form of my invention, it will be recognized that many changes in the form, shape and arrangement of parts can be made without departing from the spirit of the invention, and my showing is therefore to be taken as, in a sense, diagrammatic. Although the shell 1 and the spider portion 4 are shown as shaped integrally, it is to be understood that the spider might be formed of a separate piece positioned with or secured to the shell 1, and the invention is not limited, therefore, to a structure in which the shell 1 and the portions 3, 4, 5, 6 and 7 are all integral with each other.

I claim:

1. The method of forming a filter body which comprises the steps of shaping a piece of sheet material into a generally cup-like shape having a bottom, removing separated portions of said bottom and providing thereby a plurality of openings, forming within said openings spacing members, each comprising a pair of leg-like members diverging from each other and an integral joining part connecting said leg-like members, bending each joining part out of plane of said leg-like members and thereby moving the leg-like members of each pair toward each other and thereafter bending said leg-like members outwardly about and against said bottom.

2. The method of forming a filter body which comprises the steps of shaping a piece of sheet material into a generally cup-like shape having a bottom, shaping said bottom with a rounded edge portion, removing separated portions of said bottom and providing thereby a plurality of openings, forming within said openings spacing members, each comprising a pair of leg-like members diverging from each other and an integral joining part connecting said leg-like members, bending each joining part out of plane of said leg-like members and thereby moving the leg-like members of each pair toward each other and thereafter bending said leg-like members into the curvature of said rounded edge portion and bending said rounded leg-like portions outwardly about and against said bottom.

3. The method of forming a filter body which comprises the steps of shaping a piece of sheet material into a generally cup-like shape having a bottom, removing separated portions of said bottom and providing thereby a plurality of openings, forming integrally with said body spacing members comprising pairs of diverging leg-like parts with an integral part joining each pair of leg-like parts, bending the joining part of each set of leg-like parts out of the plane of said parts, and moving said parts toward each other, thereafter bending the spacing member as a whole about and against the bottom of the cup and welding said leg-like parts to said bottom.

JOHN J. DREZNES.

References Cited in the file of this patent

UNITED STATES PATENTS

| Number | Name | Date |
| --- | --- | --- |
| 1,215,553 | Lachman | Feb. 13, 1917 |
| 1,739,372 | Pirichio | Dec. 10, 1929 |
| 1,777,369 | Jacobs | Oct. 7, 1930 |
| 1,964,770 | Runge | July 3, 1934 |
| 2,031,936 | Cuno | Feb. 25, 1936 |
| 2,033,692 | Dover | Mar. 10, 1936 |
| 2,079,888 | Wemp | May 11, 1937 |
| 2,088,992 | Bierwith et al. | Aug. 3, 1937 |
| 2,174,639 | Sinclair | Oct. 3, 1939 |
| 2,180,411 | Graham | Nov. 21, 1939 |
| 2,260,899 | Heftler | Oct. 28, 1941 |
| 2,354,439 | Brink | July 25, 1944 |
| 2,406,188 | Beatty et al. | Aug. 20, 1946 |
| 2,459,428 | Jacobi | Jan. 18, 1949 |